(12) United States Patent
Huang et al.

(10) Patent No.: US 11,863,649 B2
(45) Date of Patent: Jan. 2, 2024

(54) SYSTEMS AND METHODS FOR CONTEXT-AWARE EVENT ORDERING PROTOCOL FOR DISTRIBUTED SERVICE SYSTEMS

(71) Applicant: Stripe, Inc., South San Francisco, CA (US)

(72) Inventors: Ji Huang, Bothell, WA (US); Tushar Dhoot, Seattle, WA (US); Alexander Thiemann, San Francisco, CA (US); Stefan Gawrys, Seattle, WA (US)

(73) Assignee: STRIPE, INC., South San Francisco, CA (US)

(*) Notice: Subject to any disclaimer, the term of this patent is extended or adjusted under 35 U.S.C. 154(b) by 0 days.

(21) Appl. No.: 17/898,422

(22) Filed: Aug. 29, 2022

(65) Prior Publication Data
US 2023/0164243 A1 May 25, 2023

Related U.S. Application Data

(63) Continuation of application No. 17/531,466, filed on Nov. 19, 2021, now Pat. No. 11,431,823.

(51) Int. Cl.
*H04L 67/62* (2022.01)
*H04L 67/01* (2022.01)
*H04L 67/51* (2022.01)

(52) U.S. Cl.
CPC .............. *H04L 67/62* (2022.05); *H04L 67/01* (2022.05); *H04L 67/51* (2022.05)

(58) Field of Classification Search
CPC ................... H04L 67/16; H04L 67/42; H04L 67/60–67/63; H04L 67/01–67/10; H04L 67/50–67/5683
See application file for complete search history.

(56) References Cited

U.S. PATENT DOCUMENTS

| | | | |
|---|---|---|---|
| 2016/0315757 A1* | 10/2016 | Malekpour | H04W 56/003 |
| 2017/0063985 A1* | 3/2017 | Xun | H04J 3/0641 |
| 2018/0067864 A1* | 3/2018 | Park | H04L 67/12 |
| 2019/0012100 A1* | 1/2019 | Sharma | G06F 3/0644 |
| 2021/0337498 A1* | 10/2021 | Lee | H04W 56/0015 |

* cited by examiner

*Primary Examiner* — Clayton R Williams
(74) *Attorney, Agent, or Firm* — Womble Bond Dickinson (US) LLP

(57) ABSTRACT

A method and apparatus for a first service processing system receiving and responding to a service request using a time context of a service time protocol is described. The method may include receiving a network based message associated with a service. The method may also include determining whether a service time context has been passed to the first service processing system from a second service processing system in the request. Furthermore, the method can include when no service time context is determined to have been passed to the first service processing system in the request, generating a current service time from a combination of a current physical time of the first service processing system and an initial counter time, performing a task associated with the service, and transmitting a second network based message that comprises the current service time as time context metadata associated with the performance of the task to a second service processing system.

20 Claims, 5 Drawing Sheets

SYSTEMS AND METHODS FOR CONTEXT-AWARE EVENT ORDERING PROTOCOL FOR DISTRIBUTED SERVICE SYSTEMS

CROSS-REFERENCE TO RELATED APPLICATIONS

This application is a continuation of U.S. patent application Ser. No. 17/531,466 filed on Nov. 19, 2021, issued as U.S. Pat. No. 11,431,823 on Aug. 30, 2022, the disclosure of which is incorporated herein by reference in its entirety.

BACKGROUND

Organizations are increasingly using distributed computing techniques to provide their products and services to end users. Such distributed computing techniques often involve the distribution of tasks performed by different physical computing resources that communicate with one another via a computing network. The distributed physical computing resources utilize network-based communication to exchange messaging that support each physical machine's functions and/or the functions of other machines within the distributed computing environment to complete an overall operation through a collection of distributed tasks. Thus, the collection of distributed physical computing resources cooperate to provide the organization's products and services to their end users.

One approach to utilizing distributed computing systems is to represent different concepts and/or resources as distinct services, where distinct services each have their own distinct processing resources and data storage within the distributed computing environment. Then, service-to-service network calls provide information transfer, requests for support services (e.g., where a service performs some function for another service), responses (e.g., a result of one service performing a requested function), etc.

With a collection of services each representing different concepts within the distributed computing environment, the ordering of events often is important to a product or service. As an example, consider a distributed computing system that uses a subscription service and an invoice service to implement a billing product for end users. Then, a subscription service might call an invoice service to create an invoice for a recurring subscription. As discussed above, each service is implemented on a distinct and different physical computing resource within a networked computing environment. As another example, a distributed computing system could manage a food delivery application including services such as an order service for managing customer orders, an order placing service that interacts with restaurants, a delivery driver service that matches and dispatches delivery drivers, as well as other services. As yet another example, a document repository or signing service may use services to manage document check in, document signing, user authentication, etc.

However, with multiple services and physical machines involved, clock skew can and will occur. Clock skew is a difference in clocks/timestamps of different physical machines that should otherwise be synchronized. When clock skew does occur, events may appear to happen out of order, which can cause user-confusion and/or system crashes. Continuing the first example above, a request may be made of the subscription service to cancel a user's subscription. However, clock skew can cause the invoice to appear to have been created after the subscription has been cancelled. Similarly, and with reference to the second example above, clock skew can cause a delivery service to appear to have dispatched a delivery driver before a food order is placed with a restaurant by the order placing service. Furthermore, in the document repository and signing service, clock skew can cause a document to appear to have been checked in and/or signed prior to a user's authentication. Clock skew therefore can cause invariants in the distributed systems that should not be able to occur and/or appear to occur.

One approach to dealing with clock skew in distributed computing environments where an order of events is relevant and/or necessary for an underlying product involves the use of a centralized timing system. With such a centralized timing system, each service requests time data (e.g., timestamp information) from the centralized timing system. Then, the centralized timing system is able to assert a global order upon which each service of the distributed computing environment can rely because the central time system uses its clock as a source of truth for timing data. However, utilizing a centralized timing system causes several problems. First, with each service requesting time information from the centralized system, bottlenecks are created as each service call to the centralized timing system must await a response before proceeding with its service, which includes waiting for the timing service to handle all responses that arrived before a current timing request. Thus, as the timing system's processing volume increases with requests for timing data, the bottleneck and potential delays with services increases. Second, excess network bandwidth is consumed because not only are service-to-service messages exchanged within the distributed computing environment, but each service further exchanges messages with the centralized timing system. As a result, an additional source of network traffic is uses that consumes network in addition to that of the service-to-service calls, which often slows down the system as a whole. Third, additional computing resources are consumed by allocating physical computing resources to the centralized timing system and processing centralized timing requests/responses. Fourth, utilization of a single centralized timing system represents a single point of failure, which if compromised, down, or otherwise is unavailable, potentially reduces the overall availability of services that rely on the centralized timing system to perform their respective operations. Fifth, development and complexity burdens are placed on developers tasked with supporting each service by requiring each developer to support and comply with the centralized timing system messaging system requirements.

Therefore, a technical solution that ensures proper event ordering in a service based distributed computing system is needed to resolve the problems discussed above.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
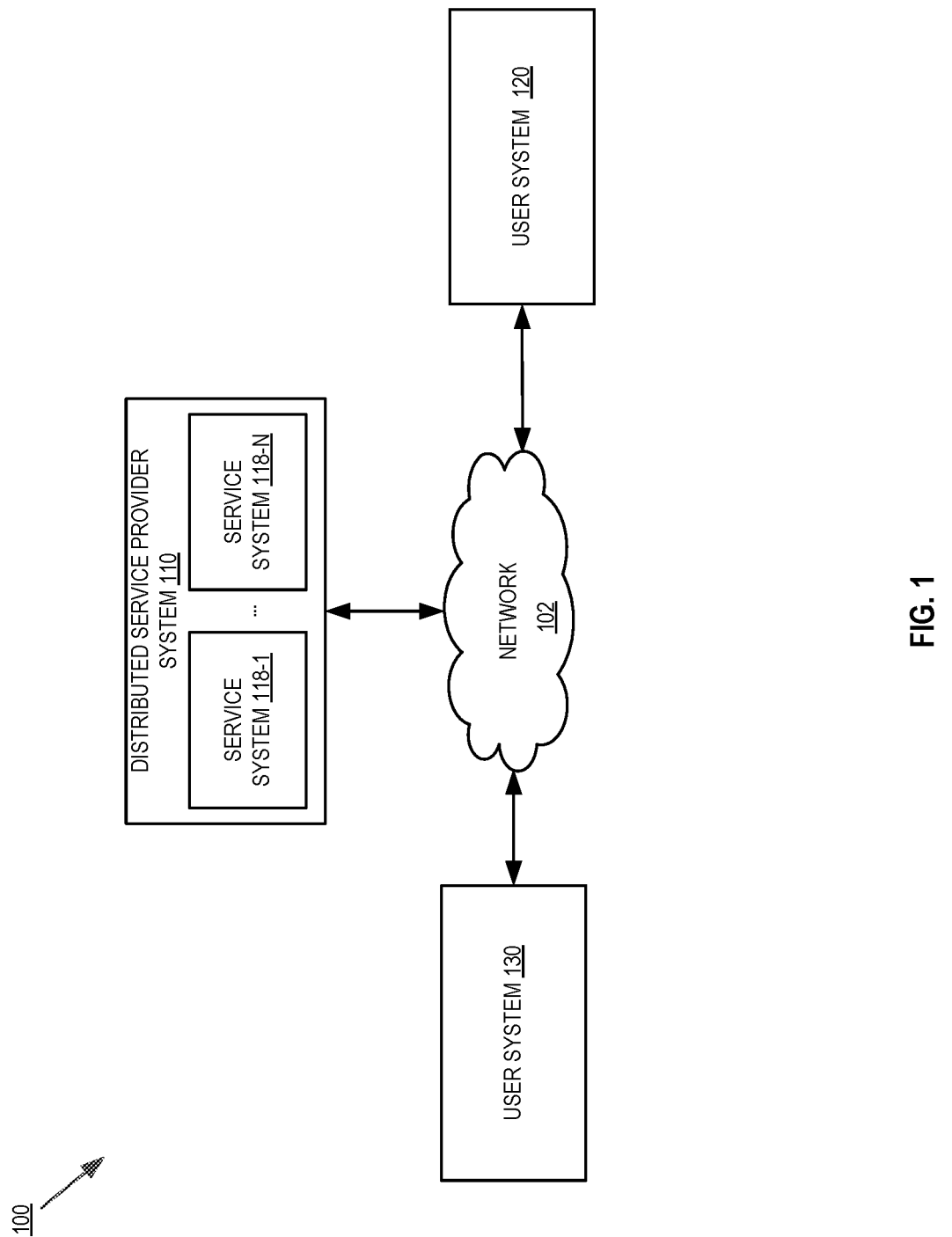
FIG. 1 is a block diagram of an exemplary system architecture for a distributed service provider system deploying distributed services in a distributed computing environment to provide products to end users.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "establishing", "writing", "sending", "receiving", "accessing", "determining", "loading", "inspecting", "updating", "including", "executing", "generating", "returning", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a distributed service provider system 110 deploying distributed services in a distributed computing environment to provide products to end users. In one embodiment, the system 100 includes distributed service provider system 110 and one or more user systems, such as user system 120 and user system 130. In one embodiment, one or more systems (e.g., systems 120 and 130) may be mobile computing devices, such as a smartphone, tablet computer, smartwatch, etc., as well computer systems, such as a desktop computer system, laptop computer system, server computer systems, etc. used by end users to access the products provided by distributed service provider system 110. The distributed service provider system 110 may also be one or more computing devices, such as one or more server computer systems, desktop computer systems, etc.

The distributed service provider system 110, user system 120, and user system 130 may be coupled to a network 102 and communicate with one another using any of the standard protocols for the exchange of information, including secure communication protocols. In one embodiment, one or more of the distributed service provider system 110, user system 120, and user system 130 may run on one Local Area Network (LAN) and may be incorporated into the same physical or logical system, or different physical or logical systems. Alternatively, the distributed service provider system 110, user system 120, and user system 130 may reside on different LANs, wide area networks, cellular telephone networks, etc. that may be coupled together via the Internet but separated by firewalls, routers, and/or other network devices. In one embodiment, distributed service provider system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, distributed service provider system 110 provides financial processing products to one or more merchants, agents of the merchants, end users, etc. For example, distributed service provider system 110 may manage merchant accounts held at the distributed service provider system 110, run financial transactions initiated at end user system performed on behalf of a merchant systems, clear transactions, performing payouts to merchants and/or merchants' agents, manage merchant and/or agent accounts held at the distributed service provider system 110, as well as other services typically associated with commerce platforms systems such as, for example, STRIPE™. However, distributed service provider system 110 is not limited to financial processing systems, as any distributed computing system that distributes service processing among different physical machines to provide a product and/or service to end users, and in which ensuring an ordering of events is desirable, may use the techniques discussed herein. For example, distributed computing environments that provide media distribution products, productivity products, social networking products, customer relationship management products, communication products, etc. may utilize the techniques discussed herein.

In an embodiment, distributed service provider system 110 is a distributed computing environment that provides products to end users, such as users associated with user system(s) 120 and 130. Products can be considered to be anything from systems that support end users (e.g., data storage, content management, payment processing, etc.). Products provided by the distributed service provider system 110 can also be systems that help a first end user system (e.g., end user system 120) manage their end users (e.g., end user system 130) using the products of the distributed service provider system 110 (e.g., end user system 130 may be associated with an agent of the end user system 120, such as a food delivery user delivering food on behalf of a food delivery platform, a parcel delivery user delivering a parcel on behalf of an online retailer, a handyman to complete a project on behalf of a task management platform, etc.). Products may also be provided to a single user, such as management of stock units sold by a user system, performing accounting for a user system, managing content distribution for a data storage user system, etc.

In embodiments, distributed service provider system 110, in providing their product(s) to user systems 120 and/or 130, therefore represents different concepts within the distributed service provider system 110 as services. For example, a first service may process functions, actions, etc. to perform a first concept, a second service may process functions, actions, etc. to perform a second concept, and so on. For example, for a distributed service provider system 110 that provides subscription service management for an end user system 120, the concepts used for providing the subscription service management may include a subscription concept that handles setting up new subscriptions, managing subscription parameters, cancelling existing subscriptions, and initiating subscription billing. The concepts may further include a second, and distinct, invoicing concept that generates, distributes, and tracks invoices for subscriptions. Furthermore, as is important in distributed service based systems, the invoicing concept not only interacts with the subscription concept, but may also interact with other concepts that may utilizing invoicing for their respective concepts, such as a single-time purchase concept, an insurance concept, a refund processing concept, a resource tracking and utilizing concept, etc.

In embodiments, each concept therefore is implemented as a service within the distributed service provider system 110, such that the service is executed on a distinct service system. Thus, distributed service provider system 110 includes a plurality of service systems 118-1 through 118-N that support the concepts that, as a whole, support the products of the distributed service provider system 110. Furthermore, each of the plurality of service systems 118-1 through 118-N are executed by one or more distinct processing systems having their own resources (e.g., processor(s), memory, network interfaces, transceivers, etc.), and service-to-service messaging is network based messaging between the distinct processing resources.

As discussed herein, since each service of the distributed service provider system 110 is performed on a distinct service system, which has its own processing resources, a system clock providing an actual time may be different, even if the service systems use network time protocol (NTP) synchronization. That is, for example, at actual time T1, a service system 118-1 may have a system time of T1, whereas simultaneously service system 118-2 may have a system time of T3 (where T3>T1). This is clock skew between the service systems, which can create inconsistencies and/or bugs that are undesirable when event order is important. For example, suppose service system 118-1 is a subscription server system providing subscription services, and service system 118-N is an invoicing server providing invoicing services. At time T1, service system 118-1 cycles an ongoing subscription, and calls on service system 118-N to generate an invoice. Due to the clock skew, the time of the invoice would have a time of T3. Now suppose that a user requests to cancel a subscription that is received at service system 118-1 at time T2 (where T3>T2>T1). The result is the invoice appearing to have been generated at time T3 after the subscription was cancelled at time T2. This is an invariant that should not occur. Therefore, it is imperative that a happens-before relationship is maintained within the distributed service provider system 110 for the services implemented by service system(s) 118-1 through 118-N.

In embodiments, context aware event timing replaces physical or system time, as event network time protocol (NTP) timing can result in clock skew that is fatal to maintaining a proper ordering of events. Furthermore, while hybrid logical clock (HLC) timing can be used to assert ordering while still having timestamps close to physical/system time, HLC systems place too much of a burden on system designers to manage and ensure correctness across services. Furthermore, a centralized timing arbiter is not desirable due to excess bandwidth consumption and load-based bottlenecking. Therefore, in the embodiments discussed herein, distributed service provider system 110 employs a service time protocol that abstracts away the complexity from the developer, and automates time management away from the network stack all the way to data storage.

In embodiments, a service time is established using a service time protocol to maintain an ordering between related events. Service time is a timestamp or timing data that is based on two components. A first component is referred to as application time and is the first X digits of a physical time value of a machine (e.g., a service system). A second component is a counter time having Y digits. Then, the service time can be thought of as a tuple formed by the X digits of physical time and the Y digits of the counter time. For example, where X is ten digits and Y is three digits, the service time can be thought of as a tuple of <application_time, counter time>, or concatenated to form a single numerical value of application time joined with counter time. In embodiments, the service time passed between services is the concatenation of application time and counter time, such as a service time being 1633059381001, where 1633059381 are the most significant digits of a service's actual/system time, and 001 is a counter time. Thus, service time uses the actual/system time digits obtained from a service system (e.g., service system 118-1) to approximate the actual passage of time, and the counter time digits to enforce ordering across related events, as discussed herein.

The service time protocol, in addition to using service time, further includes a remote procedure call (RPC) metadata layer, an object document model (ODM) middleware, and a function for getting the current service time which returns a current service time value (e.g., application time concatenated with a counter time, or a tuple having an application time and a service time). In embodiments, the service time protocol is packaged as a software library and distributed to each service system (e.g., a subset of service system(s) 118-1 through 118-N) where such service systems require time and ordering guarantees in implementing their respective services. The software library, as discussed herein ensures that a service executed on a service system does not directly interact with the service system's physical/system time, and instead interacts with service time.

In embodiments, a service at the initiation of a process (e.g., in response to a request made to the service, at the initiation of a periodic event, etc.), the service establishes a current service time, which it stores in memory as a time context. Then, this time context may be passed as metadata in service-to-service network messaging, so that services receiving requests may use and update the time context, as discussed herein. By passing and updating the time context between services, and by using the software library that abstracts away timing management functions, timing is ensured between events as services use the time context and not physical time to establish event ordering, use of a centralized time arbiter is avoided since timing establishment is distributed to systems, and development complexity is reduced as each service uses the functions within the software library of the service protocol.

Interactions between service systems passing and using a time context from a service software library of the time service protocol are discussed below.

Figure 2:
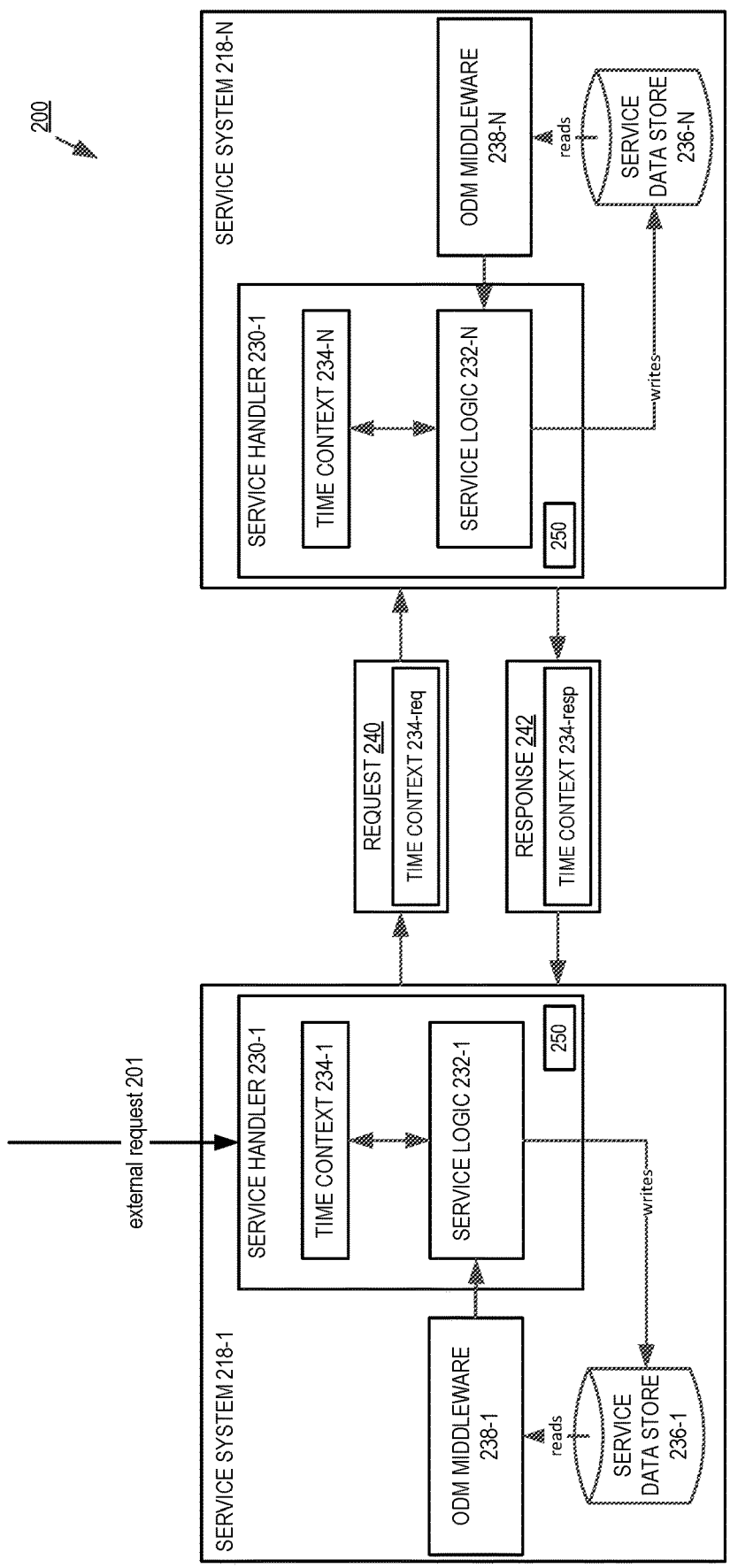
FIG. 2 is a block diagram of one embodiment of service-to-service messaging using a service time protocol.

FIG. 2 is a block diagram of one embodiment 200 of service-to-service messaging using a service time protocol.

In the embodiment 200 illustrated in FIG. 2, a service-to-service messaging exchange between service system 218-1 and 218-N is illustrated. As discussed above, each service system 218-1 through 218-N is a distinct processing system having its own hardware components. An example of a service system is discussed below in FIG. 6.

Each of service system 218-1 and 218-N respectively include a service handler 230-1 and 230-N that is responsible for interfacing with other systems to handle requests and response, a service logic 232-1 and 232-N that is responsible for implementing the functions of a given service (e.g., generating objects, executing functions, making API calls, etc. for subscription services, invoicing services, content management services, order management services, data management services, etc.), and a service data store 236-1 and 236-N for storing data generated and used by a given service (e.g., a subscription service may store data related to subscriptions, options, users associated with the subscriptions, cycle times for subscriptions, etc., an invoicing service may store data related to last invoice generated, invoice amount, user associated with an invoice, etc.). Furthermore, services 218-1 and 218-N interact with one another by exchanging electronic messages over a communications network, such as request messages 240 and response message 242. Thus, a product provided by a distributed service provider system (e.g. system 110) is implemented through the distributed services provide by service systems 218-1, 218-N, as well as other service systems (not shown).

In embodiments, each service system 218-1 and 218-N further includes the software library 250 providing the service time protocol discussed herein. As will be discussed below, the software library, when integrated by the service logic and service handler enables the use of service time context metadata, passing service time context metadata in remote procedure calls (e.g., request 240 and response 242), using an ODM middleware 238-1 to store service time data, and implementing a get current service time function within a service logic 232-1 and 232-N and/or service handler 230-1 and 230-N.

For example, in an embodiment, service handler 230-1 may receive a request (e.g., external request 201) or detect another service trigger (e.g., a time associated with a service to be provided) for performing a service associated with the service system 218-1. For example, where service system 218-1 provides a subscription service, the service to be performed may be a billing event for a user's subscription triggered by a user request to initiate a service or for a recurring subscription cycle. In response to a service trigger, an object document model is loaded by ODM middleware 238-1 from service data store 236-1. For example, an ODM may be associated with each user using service 218-1, or be a single ODM partitioned for users. In either embodiment, the loaded ODM belonging to service 218-1 is annotated so that the list of fields storing data are updated to reference the service time, and not a physical or machine time. For example, for a subscription object, fields associated with the creation of a subscription and the cancellation of the subscription, among other fields, are annotated to refer to service time (and not physical/system time). For example, the fields are updated to:

prop:cancelled_at, service_time
prop:created, service_time
prop:invoice_last_cycled, service time
. . . .

Then, in embodiments, the object document model, when loaded by ODM middleware 238-1, enables ODM middleware 238-1 establishes a current service time. In particular, ODM middleware 238-1 generates a current service that is larger than any service time from any service time in the object document model read from storage 236-1. In an embodiment, when ODM middleware 238-1 loads object, ODM middleware 238-1 establishes a current service time as a maximum of a physical time concatenated with a counter time of zero, and all service application times concatenated with respective stored counter time incremented, and if applicable, a received application service time concatenated with a counter time incremented. For example, pseudocode showing the establishment of a current service time is:

service_time=max (
    <physical_time, 000>
    <o.field1.application_time, o.field1.counter_time+1>
    <o.field2.application_time, o.field2.counter_time+1>
    <o.field3.application_time, o.field3.counter_time+1>
    . . .
    <o.fieldN.application_time, o.fieldN.counter_time+1>
    <received.application_time, received.counter_time+1>
)

Using the above formula, the service time for the request to be processed is therefore updated to be greater than any field in the loaded object. In embodiments, the integer tuples illustrated above are concatenated by the max function to generate service time integer values, and a value can be selected that is the largest integer. Using the above example object, the service time is updated by:

o.service_time=max(
    <physical_time, 000>
    <o.cancelled_at.application_time, o.cancelled_at.counter_time+1>
    <o.created.application_time, o.created.counter_time+1>
    <o.service_last_cycled.application_time, o.service_last_cycled.counter_time+1>

<received_application_time, received.counter_time+1>
)

The ODM middleware then passes the determined current service time to the time context 234-1 maintained by service handler 230-1. The time context 234-1 is maintained for the duration of the request, and globally during the processing of the request until the request is completed.

Then, for each service-to-service call, for example, service system 218-1 making a request to service system 218-N, the current service time may then be retried by service logic 218-1 from the time context 234-1. The current service time may then be passed as time context metadata 244-req in a service request message 240. Since the max function selected the largest integer from the concatenated time, counter time values, as discussed above, the time context with an example value can be represented by the pseudocode:

time_context: {
    service_time: 1633059381000
}

In some embodiments, the time context may be parsed and passed as a tuple, array, vector, etc. such as time context=<1633059381, 000>. In either embodiment, the most significant digits (e.g., 1633059381) represents an application time of the request, and the least significant digits (e.g., 000) represent a counter time for ensuring event ordering during the lifetime of the particular request.

In embodiments, from the perspective of a service system receiving a request to initiate a service (e.g., create an invoice following the example used herein), the current service time is established in one of two ways. First, if there is no service time being passed in the request (e.g., the request has no time context, such as when originating from an external/non-service source or when generated internally by service system 218-1), the request can be viewed as a first service call that abides by the service time protocol, and an initial value is established for the service time context by determining a maximum value returned form the ODM, as discussed above, which is often the current physical time with counter time set to zero.

Second, and for example from the perspective of service system 218-N, if a service time B is passed as application time through request time context metadata 234-req (e.g., a service time is a value or tuple representing a combination of the requesting service's service time and counter time), and to ensure a current service time is larger than the incoming service time, then the current service time at service system 218-N can be established as:

current_service_time=max (<physical_time, 000>, <req.application_time, req.counter_time+1>)

Using the above formula, the service time for a received request having an application service time passed as metadata is updated to be greater than the service time context passed in the request. The current service time of the service receiving a service-to-service request may then be saved to an object document model loaded by ODM middleware 238-N from storage 236-N. Service logic processes the request (e.g., generating a response to the initial request), and returns a response with its service time included as time context metadata in time context 234-resp in the response message 242.

From the perspective of service system 218-1 receiving the network-based service-to-service response 242, a time context R of the response is then established similar to above using the formula:

current_service_time=max (<physical_time, 000>, <resp.application_time, resp.counter_time+1>)

In both the request and response cases discussed above, time context is updated with the latest known service time, and updated accordingly in each respective service system's object document model.

Furthermore, for any service function that seeks to obtain a current time (e.g., for an initial request, for a subsequent service call, etc.) when the service function requires the use of timing data, the software library 250 includes a get current time function that a service logic 232-1 or 232-N can use to consult a current service time from a request/response time context, and updates the current service time by first setting the current service time to that in a received time context, and then selecting a maximum of a current physical time with counter time set to zero or the current service time from the time context. This get current time function, in embodiments, is used in place of a convention NTP or system time call so that the obtained current time abides by the service time protocol discussed herein.

Thus, when a related event occurs (e.g., cancel a subscription) after the service is processed by generating request(s) and receiving response(s), even if there is clock skew, ordering will be preserved. Continuing the previously discussed example, suppose that at time T1, service system 218-1 cycles an ongoing subscription at service time <T1, 000>, and calls on service system 218-N to generate an invoice. Due to the clock skew, the time of the invoice would have a time of <T3, 000>. As discussed above, the invoice time is <T3, 000> because a maximum of <T1,001> (the passed request time context data with counter time incremented) and <T3,000> is chosen. Since T3 contains the most significant bits of the current time context and T3>T1, then T3 concatenated with 000 is larger than T1 concatenated with 001, resulting in <T3,000> being returned by the max function. However, when a response is sent back to the original service system 218-1 to confirm the service was performed and a max is chosen from the request's original time context <T1, 000> and an incremented version of the received response time context <T3, 001>, the object document model at service system 218-1 is updated to reflect that the invoicing occurred at service time <T3, 001>. Now suppose that a user request to cancel a subscription is received at service system 218-1 at time T2 (where T3>T2>T1). The object document model at the subscription server (e.g., system 218-1) is consulted and a maximum is determined between <T2, 000> (where <T2, 000> is the current physical time, counter time tuple at the time the cancellation request is received), <T3, 002> (where <T3, 001> was stored in the object document model, and the counter time incremented as discussed above), as well as other time data tuples, for determining the cancellation time of the subscription. Thus, the subscription cancellation would have a service time of <T3,002>, which is greater than the subscription creation time <T1,000> and also greater than the subscription invoicing time <T3, 001>. Thus, from the perspective of the service system 218-1 and any other service system, the ordering of events is proper and reflects the actual order in which the events occurred.

Thus, in embodiments, by using the service time protocol, event ordering is maintained for service-to-service calls, as discussed above. Beneficially, local decisions on event timing are made by each service system, without the need to a dedicated central time arbiter and without having to generate messages to such a centralized system. This has the benefits of reducing processing resource consumption and preserving bandwidth in a distributed computing environment.

Furthermore, because each service system updates service time, service event ordering can be preserved as the system scales. Scaling would further exacerbate the problems of bandwidth consumption, bottlenecking, and resource allocation avoided by the presently discussed techniques.

Figure 3:
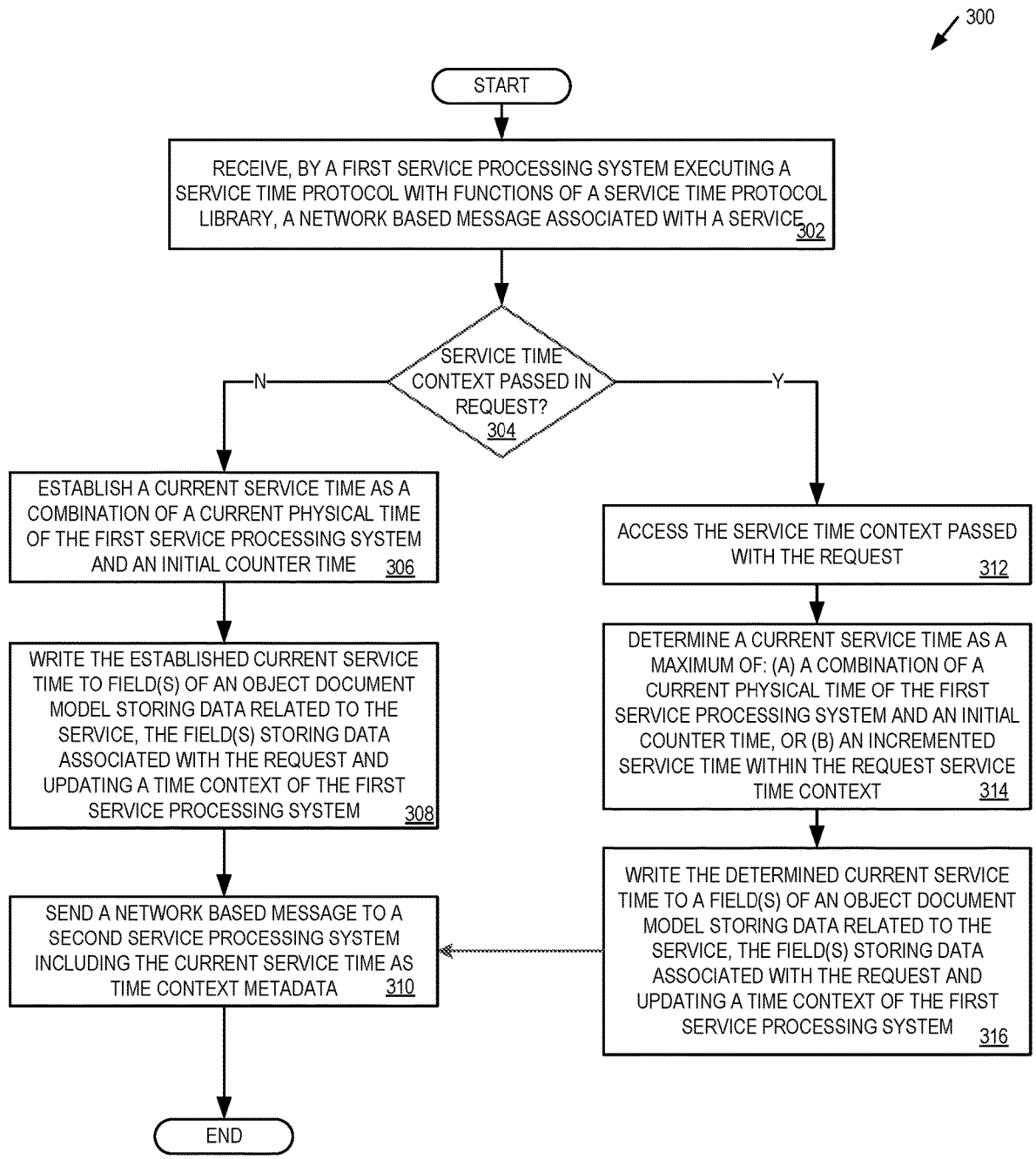
FIG. 3 one embodiment of a method for a service receiving and responding to a service request using a time context of a service time protocol.

FIG. 3 one embodiment 300 of a method for a service receiving and responding to a service request using a time context of a service time protocol. The method 300 is performed by processing logic that may comprise hardware (circuitry, dedicated logic, etc.), software (such as is run on a general purpose computer system or a dedicated machine), firmware, or a combination. In one embodiment, the method 300 is performed by a service system (e.g., service system 118-1 or 218-1).

Referring to FIG. 3, processing logic begins by receiving a network based message at a first service processing system, which executes a service time protocol with functions of a service time protocol library, the network based message associated with a service (processing block 302). As discussed herein, the first service processing system is a distinct system in a distributed computing environment with its own processing resources. Furthermore, the first service system is responsible for processing a concept within the distributed computing environment. As such, and as discussed herein, the first service system include the service time protocol and functions therefrom to establish time data and ensure event ordering during the lifetime of handling the received request. Additionally, the message may be a request or response message, such as a request for the first service processing system Processing logic then determines if a service time context has been passed in the request (processing block 304). As discussed herein, if there is no service time context in the request, then, the request is an initial request and operations of processing logic are to abide by the service time protocol from that point in time onwards through the lifetime of the request. In this case, processing logic proceed to processing block 306 to establish a current service time as a combination of a current physical time of the first service processing system and an initial counter time (processing block 306). The current service time may be an integer or a tuple, as discussed herein, with X most significant digits representing current physical time, and Y least significant digits representing current timer count.

Processing logic then writes the established current service time to field(s) of an object document model storing data related to the service, the field(s) storing data associated with the request and updating a time context of the first service processing system (processing block 308).

When, at processing block 304, a service time context is passed with the request (e.g., from a second service processing system), processing logic can determine the request is part of a service request message that abides by the service time protocol. Processing logic then accesses the service time context metadata passed with the request (processing block 312). The service time within the time context is used by processing logic to determine a current service time associated with the processing of the request. Processing logic determines a current service time as a maximum of: (A) a combination of a current physical time of the first service processing system and an initial counter time, or (B) an incremented service time within the request service time context (processing block 314). The incremented service time represents an increased counter value time of the time context, such as <application time, counter time+1>, and ensures the current service time is larger than the service time passed in the time context.

Processing logic then writes the determined current service time to field(s) of an object document model storing data related to the service, the field(s) storing data associated with the request and updating a time context of the first service processing system (processing block 316).

Then, in both scenarios (e.g., a first service request abiding by the service time protocol or a request from a second service processing system), processing logic sends a network based message to a second service processing system including the current service time as time context metadata (processing block 310). In embodiments, the time context metadata serves to notify the second service processing system of the application time (e.g., time context) of when the first service processing system performed actions in furtherance of a service. Furthermore, the first service processing system is able to determine a time context using the service time protocol that ensures proper ordering between events when returning a response to a service system or when sending a request to the service system.

Figure 4:
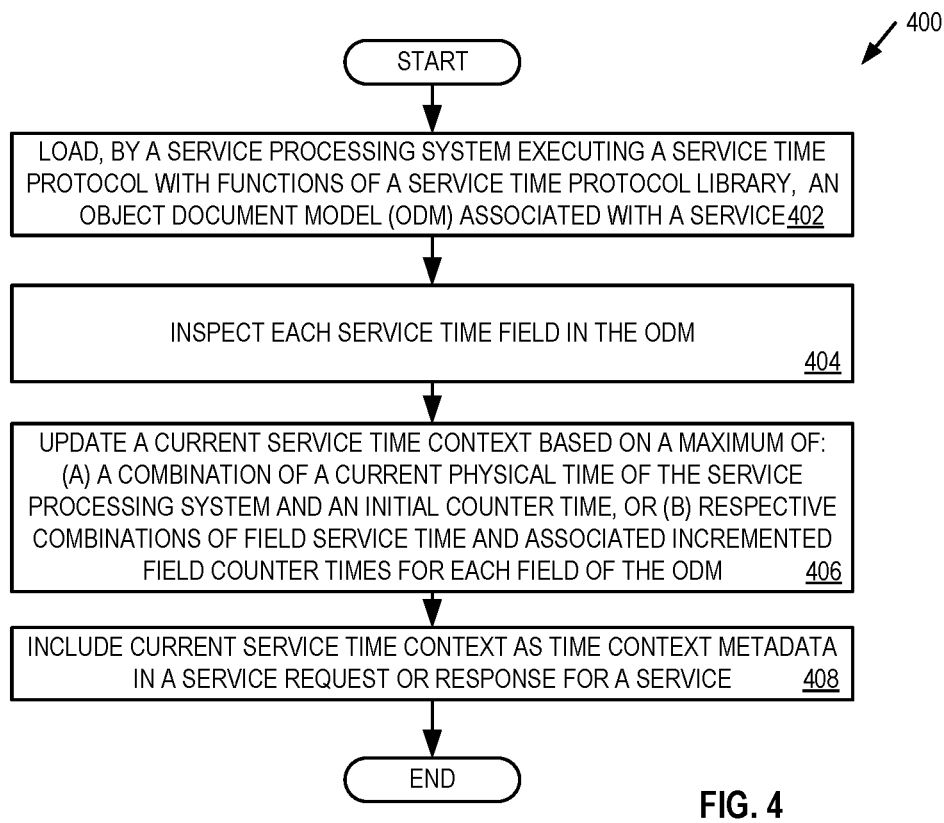
FIG. 4 is a flow diagram of one embodiment of a method for using an object document model to update a time context of a service using a service time protocol.

FIG. 4 one embodiment of a method 400 for using an object document model to update a time context of a service using a service time protocol. The method 400 is performed by processing logic that may comprise hardware (circuitry, dedicated logic, etc.), software (such as is run on a general purpose computer system or a dedicated machine), firmware, or a combination. In one embodiment, the method 400 is performed by a service system (e.g., service system 118-1, 118-N, 218-1, or 218-N). Method 400 is used by processing logic to ensure a current service time for an operation abides by a service time protocol and is larger than any prior service time.

Processing logic begins by loading, by a service processing system executing a service time protocol with functions of a service time protocol library, an object document model (ODM) associated with a service (processing block 402). For example, the object document model may store data maintained by the service provider system for a user that employs the service provided by service processing system. For example, the ODM may store user data associated with a product subscription when the service processing system provides subscription services in a distributed computing environment.

Processing logic inspects each service time field in the ODM (processing block 404). Processing logic is then able to update a current service time context of the service processing system based on a maximum of: (A) a combination of a current physical time of the service processing system and an initial counter time, or (B) respective combinations of field service time and associated incremented field counter times for each field of the ODM. Furthermore, where the ODM is loaded in response to a service message, an application time and incremented counter time may also be used when establishing a current service time context.

Processing logic then uses the current service time context as time context metadata in a service request or response for a service (processing block 408). That is, the time context metadata may be embedded as service time context data in a network based message transmitted to another service processing system within a distributed computing environment, as discussed herein.

Figure 5:
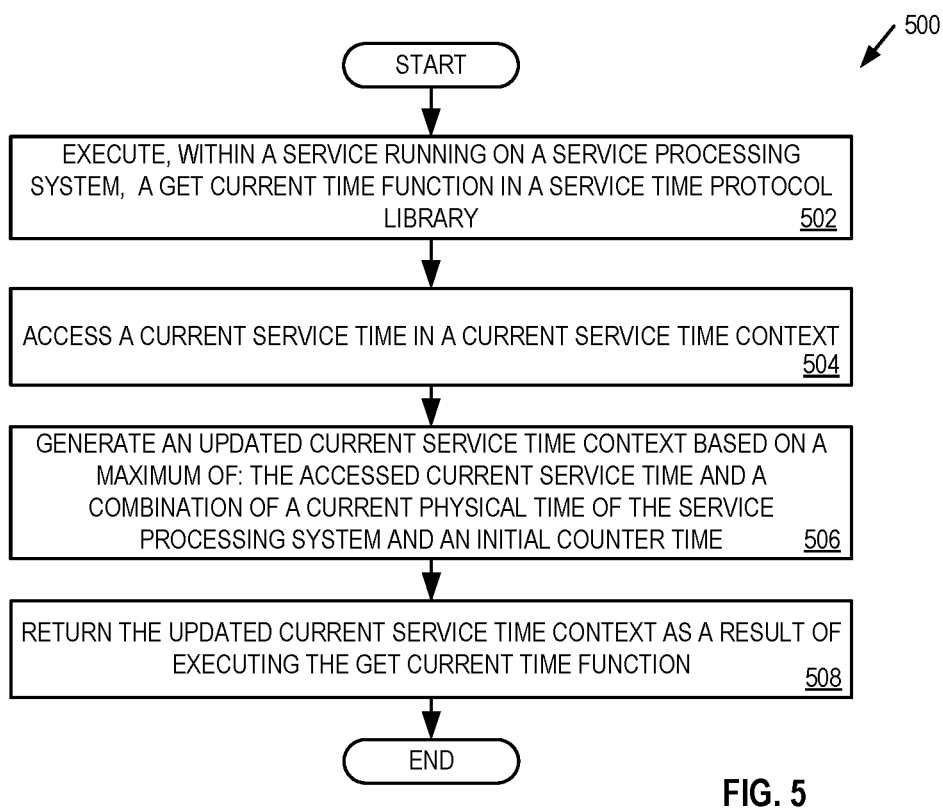
FIG. 5 is a flow diagram of one embodiment of a method for obtaining a current time context of by a service using a service time protocol.

FIG. 5 one embodiment of a method 500 for obtaining a current time context of by a service using a service time protocol. The method 500 is performed by processing logic that may comprise hardware (circuitry, dedicated logic, etc.), software (such as is run on a general purpose computer system or a dedicated machine), firmware, or a combination. In one embodiment, the method 500 is performed by a service system (e.g., service system 118-1, 118-N, 218-1, or 218-N). Method 500 is used by processing logic of a service to obtain a current service time to be associated with service data, without interacting with a processing systems physical time or network time.

Processing logic begins by executing, within a service running on a service processing system, a get current time function in a service time protocol library (processing block 502). That is, the service processing system includes a service processing library, and use a service time function to access a current service time for a field of data within the service.

For example, the get current time function from the library can be used by a subscription service when cycling a subscription as shown in the following pseudocode:

function cycle_sub (subscription)
{
   invoice=invoice.create (subscription.line_item).
   subscription.last_invoice=invoice.id;
   //using service time function
   subscription.last_cycle_at =GetCurrentTime ( ):
   subscription.save( ):
}

In response to executing the get current service time function, processing logic accesses a current service time in a current service time context (processing block 504). The current service time may be added to a service time context, as discussed above.

Processing logic then generates an updated current service time context based on a maximum of: the accessed current service time and a combination of a current physical time of the service processing system and an initial counter time (processing block 506), and returns the updated current service time context as a result of executing the get current time function (processing block 508). Thus, in the pseudocode above, the subscription.last_cycle_at field in an objected document model is updated to reflect the current service time associated with the cycling of the subscription.

Figure 6:
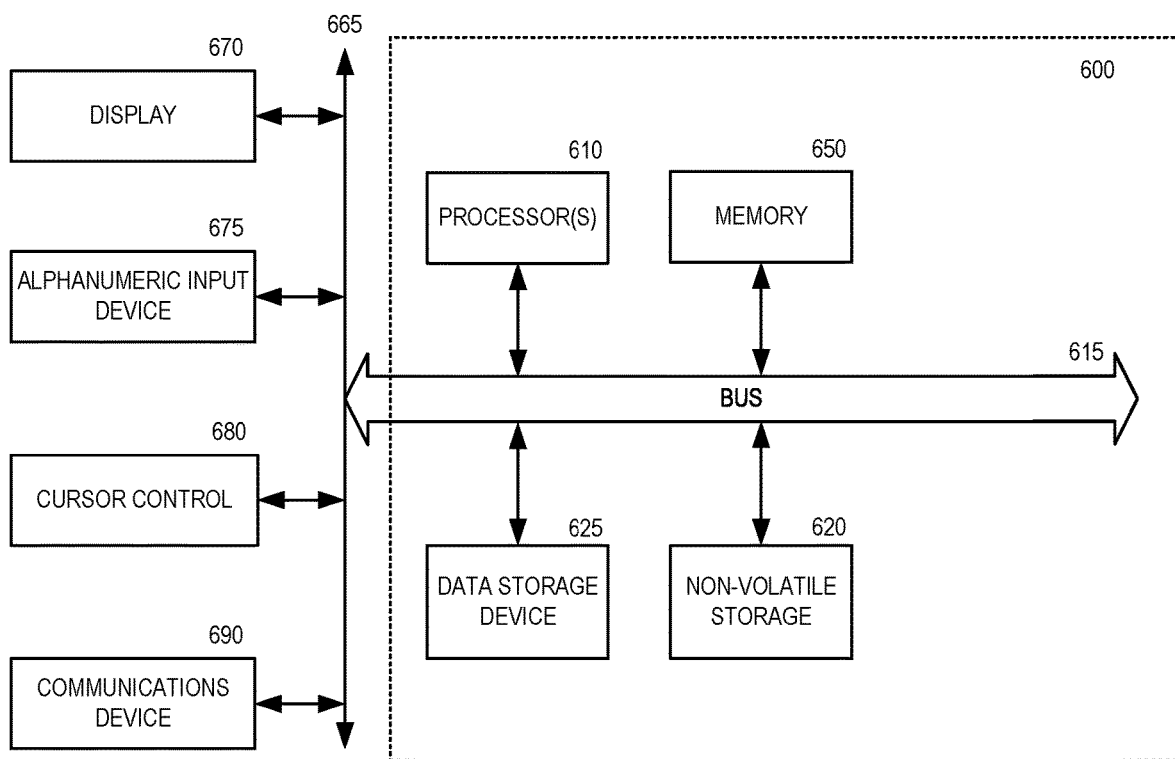
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a commerce platform system, a merchant development system, merchant user system, etc. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for a first service processing system receiving and responding to a service request using a time context of a service time protocol, the method comprising:
    receiving, by the first service processing system, a network based message associated with a service;
    determining, by the first service processing system, whether a service time context has been passed to the first service processing system from a second service processing system, in the request;
    when the service time context is determined to have been passed to the first service processing system in the request:
        accessing, by the first service processing system, a service time context passed with the request,
        generating, by the first service processing system, a current service time based on the service time context passed with the request,
        performing, by the first service processing system, a task associated with the service, and
        transmitting, by the first service processing system to a second service processing system, a second network based message in response to the network based message associated with the service that comprises the current service time as the service time context metadata associated with the performance of the task.

2. The method of claim 1, wherein generating the current service time based on the service time context passed with the request further comprises:
    generating, by the first service processing system, the current service time as a maximum value of: (A) a first value formed from a joining of a current physical time of the first service processing system with an initial counter time value, or (B) a second value determined as an incremented request service time within the service time context passed with the request.

3. The method of claim 1, further comprising:
    loading, by the first service processing system in response to receiving the request, an object document model, wherein one or more fields of the object document model are each configured to store a field service time value; and
    storing, by the first service processing system, the current service time to one or more fields of the object document model associated with the task.

4. The method of claim 1, wherein most significant digits of the generated current service time comprise a first set of most significant digits from the current physical time of the first service processing system, and least significant digits of the generated current service time further comprises a counter time.

5. The method of claim 4, wherein the generated current service time is a positive integer formed by joining the first set of most significant digits from the current physical time with the counter time.

6. The method of claim 1, wherein the first service processing system includes a service time protocol library and executes one or more functions included in the service time protocol library to implement the service time protocol, comprising:
    executing, by the first processing system, a get current service time function for the service time protocol library, to generate the current service time.

7. The method of claim 6, wherein the first service processing system and the second service processing system are each executed on distinct computer processing systems in a distributed computing environment.

8. The method of claim 1, wherein the distributed computing environment comprises a payments processing system.

9. A non-transitory computer readable storage medium including instructions that, when executed by a processor, cause the processor to perform operations for a first service processing system receiving and responding to a service request using a time context of a service time protocol, the operations comprising:
    receiving, by the first service processing system, a network based message associated with a service;
    determining, by the first service processing system, whether a service time context has been passed to the first service processing system from a second service processing system, in the request;
    when the service time context is determined to have been passed to the first service processing system in the request:
        accessing, by the first service processing system, a service time context passed with the request,
        generating, by the first service processing system, a current service time based on the service time context passed with the request,
        performing, by the first service processing system, a task associated with the service, and
        transmitting, by the first service processing system to a second service processing system, a second network based message in response to the network based message associated with the service that comprises the current service time as the service time context metadata associated with the performance of the task.

10. The non-transitory computer readable storage medium of claim 9, wherein generating the current service time based on the service time context passed with the request further comprises:
    generating, by the first service processing system, the current service time as a maximum value of: (A) a first value formed from a joining of a current physical time of the first service processing system with an initial counter time value, or (B) a second value determined as an incremented request service time within the service time context passed with the request.

11. The non-transitory computer readable storage medium of claim 9, further comprising:
    loading, by the first service processing system in response to receiving the request, an object document model, wherein one or more fields of the object document model are each configured to store a field service time value; and storing, by the first service processing system, the current service time to one or more fields of the object document model associated with the task.

12. The non-transitory computer readable storage medium of claim 9, wherein most significant digits of the generated current service time comprise a first set of most significant digits from the current physical time of the first service processing system, and least significant digits of the generated current service time further comprises a counter time.

13. The non-transitory computer readable storage medium of claim 12, wherein the generated current service time is a positive integer formed by joining the first set of most significant digits from the current physical time with the counter time.

14. The non-transitory computer readable storage medium of claim 9, wherein the first service processing system includes a service time protocol library and executes one or more functions included in the service time protocol library to implement the service time protocol, comprising:
    executing, by the first processing system, a get current service time function for the service time protocol library, to generate the current service time.

15. The non-transitory computer readable storage medium of claim 14, wherein the first service processing system and the second service processing system are each executed on distinct computer processing systems in a distributed computing environment.

16. The non-transitory computer readable storage medium of claim 9, wherein the distributed computing environment comprises a payments processing system.

17. A first service processing system, comprising:
    a memory; and
    a processor, coupled with the memory, configured to:
        receive a network based message associated with a service,
        determine whether a service time context has been passed to the first service processing system from a second service processing system, in the request,
        when the service time context is determined to have been passed to the first service processing system in the request:
            access a service time context passed with the request,
            generate a current service time based on the service time context passed with the request,
            perform a task associated with the service, and
            transmit, to a second service processing system, a second network based message in response to the network based message associated with the service that comprises the current service time as the service time context metadata associated with the performance of the task.

18. The first service processing system of claim 17, wherein the processor configured to generate the current service time based on the service time context passed with the request, further comprises the processor configured to:
    generate the current service time as a maximum value of:
        (A) a first value formed from a joining of a current physical time of the first service processing system with an initial counter time value, or (B) a second value determined as an incremented request service time.

19. The first service processing system of claim 17, wherein the first service processing system and the second service processing system are each executed on distinct computer processing systems in a distributed computing environment.

20. The first service processing system of claim 17, wherein most significant digits of the generated current service time comprise a first set of most significant digits from the current physical time of the first service processing system, and least significant digits of the generated current service time further comprises a counter time.

* * * * *